United States Patent
Booher, Sr.

(10) Patent No.: US 9,701,399 B1
(45) Date of Patent: Jul. 11, 2017

(54) PARASITIC DRAG INDUCED BOUNDARY LAYER REDUCTION SYSTEM AND METHOD

(71) Applicant: TechDyne LLC, Scottsdale, AZ (US)

(72) Inventor: Benjamin V. Booher, Sr., Scottsdale, AZ (US)

(73) Assignee: TechDyne LLC, Scottsdale, AZ (US)

( * ) Notice: Subject to any disclaimer, the term of this patent is extended or adjusted under 35 U.S.C. 154(b) by 156 days.

(21) Appl. No.: 14/218,819

(22) Filed: Mar. 18, 2014

Related U.S. Application Data

(60) Provisional application No. 61/803,055, filed on Mar. 18, 2013.

(51) Int. Cl.
*B64C 21/06* (2006.01)

(52) U.S. Cl.
CPC .......... *B64C 21/06* (2013.01); *B64C 2230/20* (2013.01)

(58) Field of Classification Search
CPC ....... B64C 21/02; B64C 21/025; B64C 21/04; B64C 21/06; B64C 21/08; B64C 2230/06; B64C 2230/20; F15D 1/003; F15D 1/0035; F15D 1/004; F15D 1/0055
See application file for complete search history.

(56) References Cited

U.S. PATENT DOCUMENTS

| | | | |
|---|---|---|---|
| 1,513,241 A | 10/1924 | Harding | |
| 2,041,793 A | 5/1936 | Stalker | |
| 2,406,916 A | 9/1946 | Stalker | |
| 2,511,504 A | 6/1950 | Hawkins | |
| 2,643,832 A * | 6/1953 | Thwaites | ................ B64C 21/06 244/117 A |
| 2,646,945 A * | 7/1953 | Perry | ............................ 244/204 |
| 2,650,781 A * | 9/1953 | Taylor | ........................... 244/198 |
| 2,833,492 A | 5/1958 | Fowler | |
| 2,894,703 A | 7/1959 | Hazen et al. | |
| 2,939,650 A | 6/1960 | Coanda | |

(Continued)

FOREIGN PATENT DOCUMENTS

| | | |
|---|---|---|
| GB | 610620 A | 10/1948 |
| JP | H05345596 | 12/1993 |

(Continued)

OTHER PUBLICATIONS

"Aerodynamic Devices" http://www.centennialofflight.gov/essay/Theories_of_Flight/Devices/TH17.htm.

(Continued)

*Primary Examiner* — Tien Dinh
*Assistant Examiner* — Richard R Green
(74) *Attorney, Agent, or Firm* — Booth Udall Fuller, PLC

(57) ABSTRACT

A parasitic drag induced boundary layer reduction system and methods for reducing the boundary layer on aircraft, vehicles, and structure. The system may include a suction generator configured to utilize parasitic drag in reducing boundary layer effect and enhancing laminate flow. The suction generator may include at least one of a suction port on a rearward facing surface of an aircraft, a suction vane on each wing of the aircraft, a wingtip vane on each wing of the aircraft, and a slotted tail section on a tail of the aircraft. The system may also include an induction structure configured to introduce airflow to suction created by the suction generator as the aircraft is in flight.

22 Claims, 10 Drawing Sheets

(56) References Cited

U.S. PATENT DOCUMENTS

| | | | |
|---|---|---|---|
| 3,213,819 A | 10/1965 | May | |
| 3,317,162 A | 5/1967 | Grant | |
| 3,360,221 A | 12/1967 | Heskestad | |
| 3,951,360 A | 4/1976 | Anxionnaz | |
| 4,000,869 A | 1/1977 | Wong et al. | |
| 4,114,836 A * | 9/1978 | Graham et al. | 244/1 N |
| 4,146,202 A | 3/1979 | Pender | |
| 4,522,360 A | 6/1985 | Barnwell et al. | |
| 4,664,345 A | 5/1987 | Lurz | |
| 4,726,548 A | 2/1988 | Clites | |
| 4,749,150 A | 6/1988 | Rose et al. | |
| 4,863,118 A | 9/1989 | Stallings, Jr. et al. | |
| 4,993,663 A | 2/1991 | Lahti et al. | |
| 5,014,932 A | 5/1991 | Driftmyer | |
| 5,125,597 A | 6/1992 | Coffinberry | |
| 5,137,230 A | 8/1992 | Coffinberry | |
| 5,222,698 A | 6/1993 | Nelson et al. | |
| 5,366,177 A | 11/1994 | DeCoux | |
| 5,417,391 A | 5/1995 | Savitsky et al. | |
| 5,590,854 A * | 1/1997 | Shatz | 244/206 |
| 5,743,493 A * | 4/1998 | McCaughan | B64C 21/025 244/130 |
| 5,772,156 A | 6/1998 | Parikh et al. | |
| 5,848,768 A | 12/1998 | Seyfang | |
| 5,971,327 A | 10/1999 | Loth | |
| 6,068,328 A | 5/2000 | Gazdzinski | |
| 6,094,907 A | 8/2000 | Blackner | |
| 6,135,395 A | 10/2000 | Collett | |
| 6,176,454 B1 | 1/2001 | Grosche et al. | |
| 6,216,982 B1 | 4/2001 | Pfennig et al. | |
| 6,334,753 B1 * | 1/2002 | Tillman | B64C 21/04 415/1 |
| 6,357,374 B1 | 3/2002 | Moore et al. | |
| 6,752,358 B1 | 6/2004 | Williams et al. | |
| 7,200,999 B2 * | 4/2007 | Bagnall et al. | 60/785 |
| 7,866,609 B2 * | 1/2011 | Parikh | 244/209 |
| 2009/0212165 A1 | 8/2009 | Parikh | |

FOREIGN PATENT DOCUMENTS

| | | |
|---|---|---|
| JP | H1134990 | 2/1999 |
| SU | 342809 | 11/1972 |

OTHER PUBLICATIONS

"Bluff-body drag reduction by passive ventilation" http://nal-ir.nal.res.in/1740/01/ep-16/1993.pdf.

"Boundary-Layer control" http://eel.me.pusan.ac.kr/Data_Lecture/Boundary_Layer_Control_%EC%8B%9C%EC%B2%AD%EA%B0%81%EC%9E%90%EB%A3%8C.pdf.

"Laminar Flow" http://www.slideshare.net/ahmad1957/laminarflow-presentation.

* cited by examiner

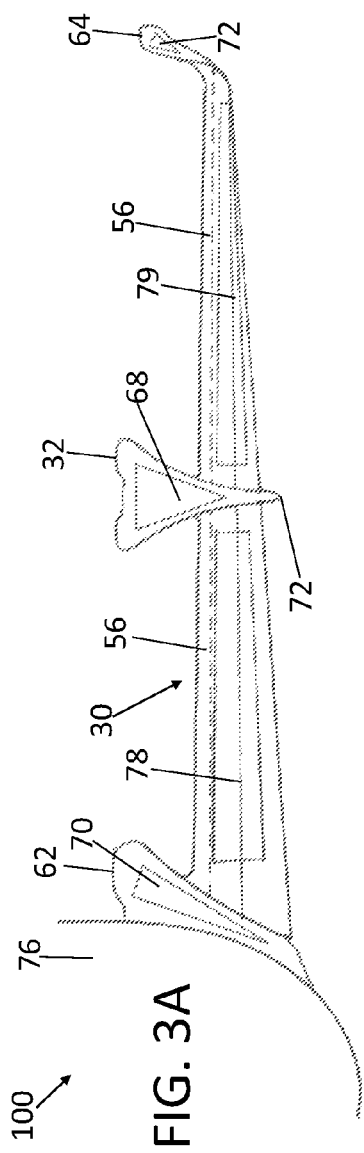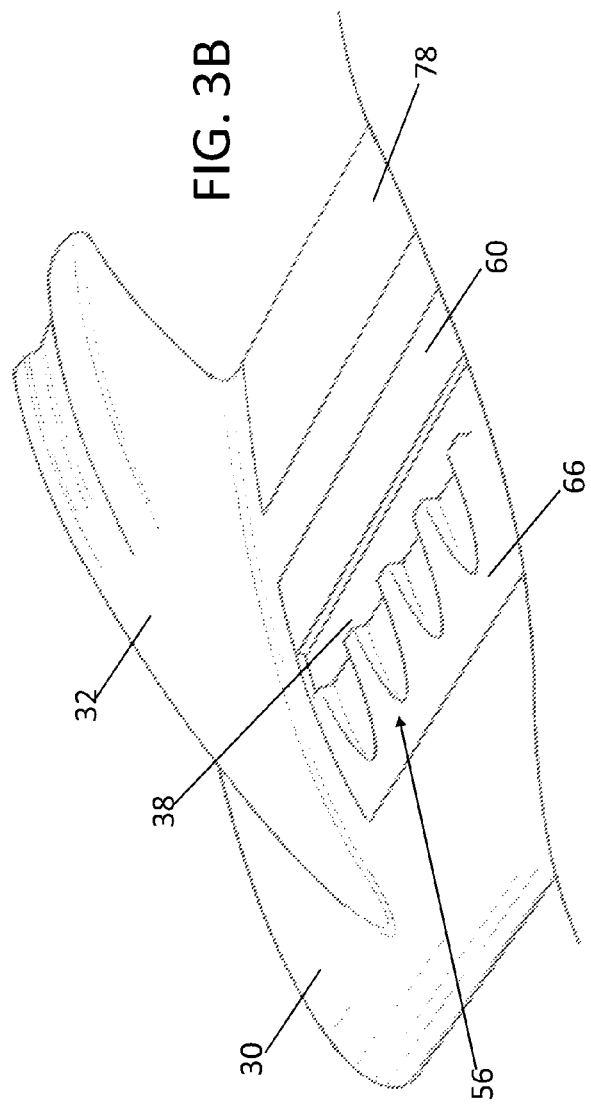
FIG. 3A
FIG. 3B

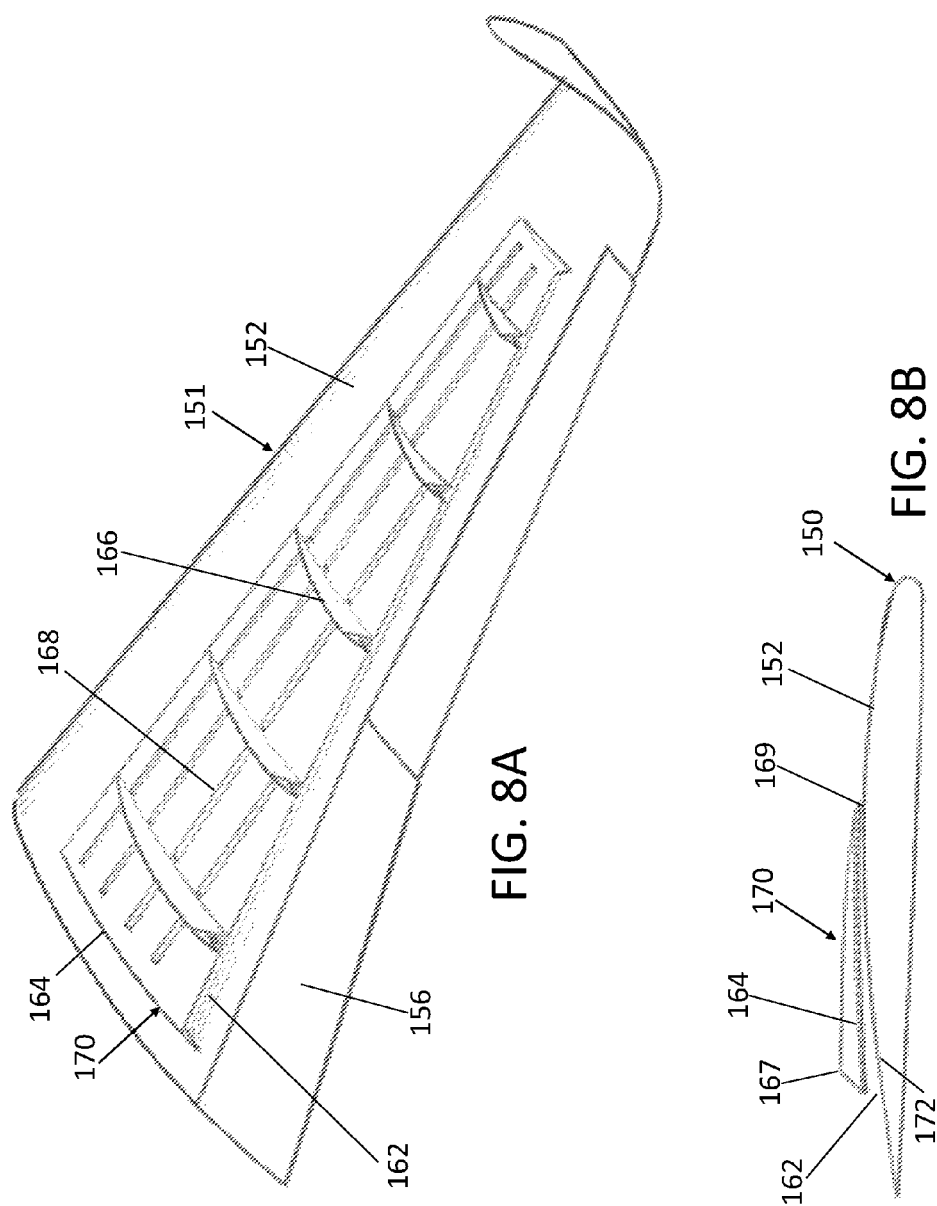

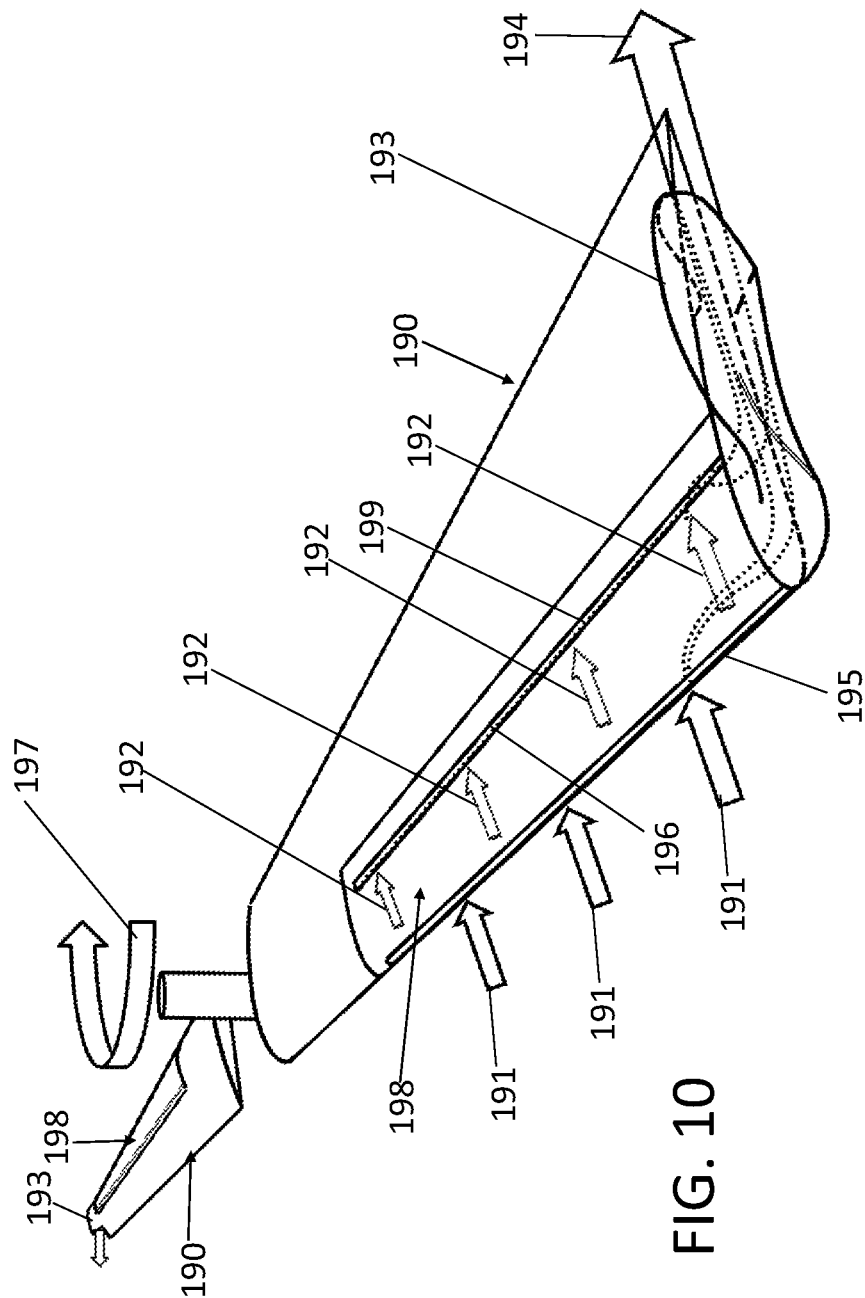

PARASITIC DRAG INDUCED BOUNDARY LAYER REDUCTION SYSTEM AND METHOD

CROSS REFERENCE TO RELATED APPLICATIONS

This document claims the benefit of the filing date of U.S. Provisional Patent Application 61/803,055, entitled "Parasitic Drag Induced Boundary Layer Reduction System" to Booher which was filed on Mar. 18, 2013, the contents of which are hereby incorporated by reference.

BACKGROUND

1. Technical Field

Aspects of this document relate generally to improved methods and systems for reducing fuel consumption and improving aerodynamic efficiency and performance of vehicles, especially regarding boundary layer reduction and enhanced laminar flow systems. Particular implementations also include parasitic drag induced boundary layer reduction systems.

2. Background Art

Laminar flow occurs when a fluid flows in parallel layers, with no disruption between the layers. In fluid dynamics, laminar flow is a flow characterized by high momentum diffusion and low momentum convection. For the purpose of understanding the following descriptions, non-laminar flow, sometimes referred to as turbulent flow, results when laminar flow is compromised by one or more factors as further described below.

In factoring flow conditions leading to laminar or turbulent flow, an important parameter in the equations is the Reynolds number. In fluid mechanics, the Reynolds number is a dimensionless number that gives a measure of the ratio of inertial forces to viscous forces and consequently quantifies the relative importance of these two types of forces for given flow conditions. The Reynolds number upon which laminar flows become turbulent is dependent upon the flow geometry. When the Reynolds number is much less than 1, Creeping Motion or Stokes Flow occurs (an extreme example of laminar flow where viscous/friction effects are much greater than inertial forces).

At high Reynolds numbers it is desirable to have a laminar boundary layer. This results in an effectively lower skin friction due to the interaction between the characteristic velocity profile of laminar flow and the primary flow. However, as the flow develops along the body, the boundary layer increases and becomes less stable, eventually becoming turbulent. This process is known as boundary layer transition.

At lower Reynolds numbers, it is relatively easy to maintain laminar flow, with resulting low skin friction. However, the same velocity profile that gives the laminar boundary layer its low skin friction also introduces adverse pressure gradients known as pressure drag. Therefore, as the pressure begins to recover over the rear part of the wing chord, a laminar boundary layer will tend to separate from the surface. Such flow separation causes a significant increase in pressure drag (hereinafter parasitic drag), since it greatly increases the effective size of the body section.

Specifically relating to the flow of air over an airplane wing, the boundary layer is a relatively thin 'sheet' of air lying over the surface of the wing (and other surfaces of the airplane). Because air has viscosity (friction interaction with adjacent particles moving at different velocities), this layer of air tends to adhere to the wing. As the wing moves forward through the air, the boundary layer at first flows smoothly over the streamlined shape of the airfoil and the boundary layer is a laminar layer. However, as the speed of the wing increases, the boundary layer breaks away from the surface and creates an increasing low-pressure region immediately behind the airfoil (sometimes referred to as flow separation). This low-pressure region results in increased overall drag (principally parasitic drag). Furthermore, that separation creates a boundary layer effect, where laminar flow is compromised and more turbulent flow results, decreasing the efficiency of the wing's 'lift geometry' and performance while also increasing drag. Those inefficiencies lead to high fuel consumption and limit the performance of the aircraft. Therefore, it is desirable to control or reduce the boundary layer.

Attempts have been made over the years to delay the onset of flow separation by careful attention to design geometry, smoothing of surfaces and other passive technologies such as vortex generators developed to reduce various factors to non-laminar flow, but those efforts have resulted in only minimal improvements.

In concept, a significant way of improving airflow by reducing the boundary layer includes boundary layer suction, an approach by which an 'air pump' is used to extract the boundary layer from the wing's top surface, thereby improving the airflow and reducing drag. However, the systems that have been used to produce the suction are very complicated, heavy, and prone to high rates of failure (from contamination and other factors), and usually require an additional engine (or additional work for existing engines) to act as or power the necessary air pump. Moreover, when these systems (commonly referred to as active) fail, the aircraft's flight performance can deteriorate significantly (including to critically dangerous levels).

SUMMARY

According to one aspect, a parasitic drag induced boundary layer reduction system for an aircraft comprises a suction generator and an induction panel. The suction generator is configured to induce parasitic drag so as to produce suction used to lessen boundary layer effect and improve laminar airflow about the aircraft. The suction generator comprises at least one of a suction port on a rearward facing surface of the aircraft, a suction vane on each wing of the aircraft, a wingtip vane on each wing of the aircraft, and a slotted tail section on a tail of the aircraft. The induction panel is configured to introduce airflow to suction created by the suction generator as the aircraft is in flight.

Various implementations and embodiments of a parasitic drag induced boundary layer reduction system for an aircraft may comprise one or more of the following. The suction generator may comprise at least the suction vane on each wing of the aircraft and the induction panel may comprise a leading edge portion and an inlet slot proximate an area of flow separation aft of the leading edge portion, the inlet slot being in fluid communication with a rearward opening on the suction vane such that airflow enters the inlet slot responsive to the suction generator as the aircraft is in flight and exits through the rearward opening of the suction vane. The suction generator may further comprise at least the suction port positioned on the rearward facing surface of the aircraft, the suction port comprising a rearward opening in fluid communication with the inlet slot such that airflow enters the inlet slot responsive to the suction generator as the aircraft is in flight and exits through the rearward opening of the suction port. The suction generator may comprise the wingtip vane, the wingtip vane comprising a rearward opening. The induction apparatus may comprise a second induction panel on each wing positioned between the suction vane and the wingtip vane, the second induction panel comprising a leading edge portion and an inlet slot proximate the leading edge portion in fluid communication with the rearward openings of the suction vane and the wingtip vane such that airflow enters the inlet slot responsive to the suction generator as the aircraft moves and exits through the rearward openings of the wingtip vane and suction vane. A lower section of the suction vane may be configured to provide drainage for fluid entering the inlet slot of either the first or second induction panel. Each induction panel may comprise an inlet plate proximate the inlet slot, the inlet plate being movable during flight to at least partially close the inlet slot. The suction generator may comprise the slotted tail section positioned on the tail of the plane, the suction vane on each wing, and two suction ports, each suction port being positioned on the rearward facing surface of a fuselage of the aircraft proximate each wing. Each suction port may comprise a rearward facing cover operably coupled to the suction port and configured to cover and uncover the suction port and a forward facing cover operably coupled to the suction port and configured to cover and uncover a forward facing opening in fluid communication with the suction port. The induction panel may comprise a plurality of transverse blades and a plurality of induction slots extending through the plurality of transverse blades. The plurality of transverse blades may be configured to assist in flight control of the aircraft. A boundary layer skirt coupled to each wing of the aircraft, wherein the suction generator comprising a plurality of suction vanes coupled to the boundary layer skirt and the induction panel comprises a plurality of induction slots positioned on the induction panel. The aircraft may comprise an airplane. The aircraft may comprise a helicopter, the wing of the aircraft may comprise a rotor blade of the helicopter, and the suction generator may comprise at least a suction vane on one or more rotor blades of the helicopter.

According to another aspect, a method of controlling aircraft external airflow comprises generating parasitic drag to create suction proximate one or more rearward facing surfaces of the aircraft as the aircraft moves with a suction generator, the suction generator comprising at least one of a suction vane on each wing, a wingtip vane on each wing, a suction port positioned on a rearward facing surface of the aircraft, and a slotted tail suction on a tail of the plane.

Various implementations and embodiments of a method for controlling aircraft external airflow may comprise one or more of the following. Introducing, with an induction panel, the suction created by the suction generator to airflow as the aircraft is in flight. Introducing, with the induction panel, the suction created by the passive suction generator to the airflow may comprise introducing the airflow to the suction by directing the airflow into an inlet slot of the induction panel with a leading edge portion of the induction panel and directing the airflow out of a rearward facing opening on a suction vane in fluid communication with the inlet slot. Introducing airflow to the suction by directing the suction generated by a suction port on a rearward facing surface of the aircraft in fluid communication with the inlet slot. Adjusting the parasitic drag of the aircraft while the aircraft is in flight by adjusting an inlet plate proximate the inlet slot to at least partially cover or uncover the inlet slot. Adjusting the parasitic drag of the aircraft while the aircraft is in flight by partially or closing a forward facing opening on the suction port, the forward facing opening being in fluid communication with the suction port. Coupling a boundary layer skirt to each wing of the aircraft, the boundary layer skirt comprising the passive suction generator and the induction panel.

According to another aspect, a parasitic drag induced boundary layer reduction apparatus for a vehicle or an aircraft comprises a boundary layer skirt. The boundary layer skirt is configured to couple to the vehicle or the aircraft and comprises one or more suction vanes and an induction panel. The one or more suction vanes are configured to passively generate parasitic drag that creates suction approximate the boundary layer skirt when the boundary layer skirt is coupled to a moving vehicle or aircraft. The induction panel is configured to introduce airflow to the suction created by the one or more suction vanes when the boundary layer skirt is coupled to a moving vehicle or aircraft.

Various implementations and embodiments may comprise one or more of the following. The induction panel may comprise a plurality of induction slots in fluid communication with a rearward facing opening on each of the one or more suction vanes. The induction panel may comprise a plurality of transverse blade portions having one or more induction slots in fluid communication with a rearward facing surface on the one or more suction vanes.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 3A is a rear view of a wing on an aircraft with certain aspects of this disclosure;

FIG. 3B is a front perspective view of a portion of an aircraft wing with certain aspects of this discloser;

FIG. 8A is a top perspective view of a wing having a boundary layer skirt;

FIG. 8B is a side view of a wing having a boundary layer skirt;

FIG. 10 is a perspective view of rotor blades of a helicopter having a boundary layer reducing system.

DESCRIPTION

Figure 1:
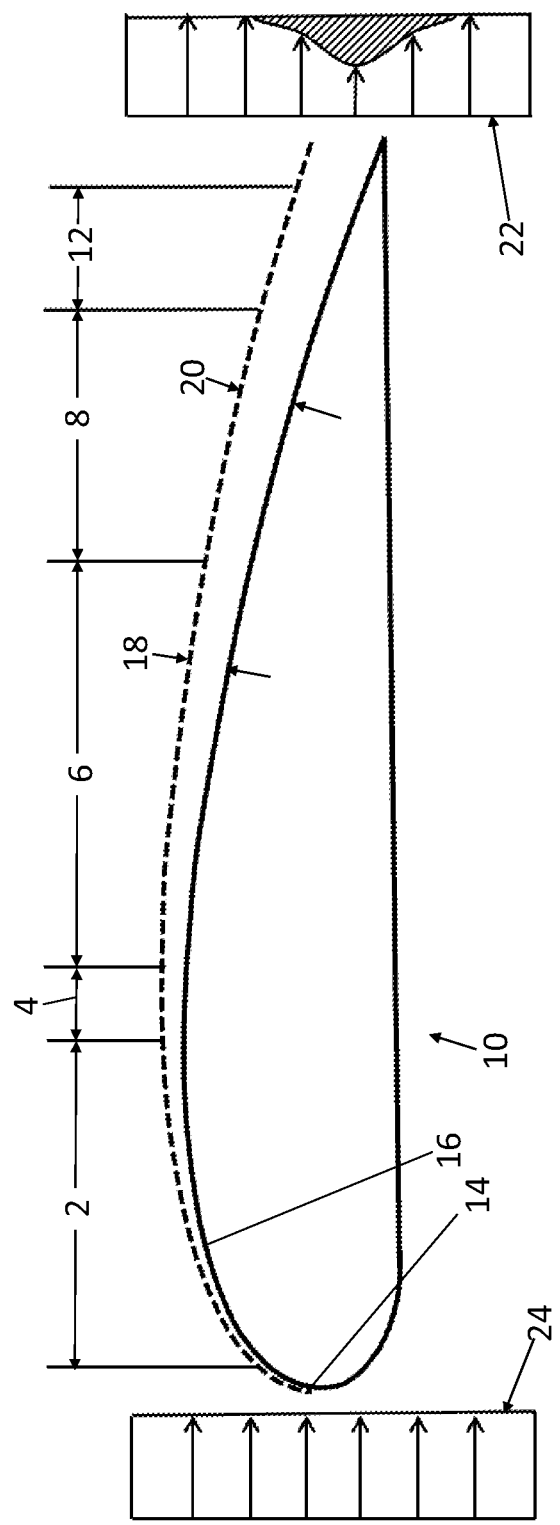
FIG. 1 is a side view of airflow over a conventional wing known in the prior art.

This disclosure, its aspects and implementations, are not limited to the specific components, their arrangement or assembly procedures disclosed herein. Many additional components, arrangements and assembly procedures consistent with the intended parasitic drag induced boundary layer reduction system and/or assembly procedures for a parasitic drag induced boundary layer reduction system will become apparent for use with implementations of parasitic drag induced boundary layer reduction systems from this disclosure. Accordingly, for example, although particular parasitic drag induced boundary layer reduction systems and methods are disclosed, such parasitic drag induced boundary layer reduction system and implementing components may comprise any shape, size, style, type, model, version, measurement, concentration, material, quantity, and/or the like as is reasonable in the art for such parasitic drag induced boundary layer reduction system and implementing components, consistent with the intended operation of a parasitic drag induced boundary layer reduction system of this disclosure.

Controlling the behavior of the boundary layer on an aircraft minimizes drag. Two principle affects are typically considered in such systems: first, the boundary layer adds to the effective thickness of the wing (through displacement thickness) thereby increasing the parasitic drag; and second, shear forces at the surface of the wing, which create skin friction drag (hereinafter induced drag). Implementations of the disclosed design approach these and other critical factors including but not limited to maintaining improved laminar flow and reducing drag by novel innovations (primarily to the 'suction system' of this disclosure required to reduce the boundary layer) which may result in reduced manufacturing costs, reduced complexity, less weight, and elimination of the reliance upon pump mechanisms (which require engines or other power sources). These improvements may also eliminate concerns regarding reliability and system contamination and failure. Particular implementations may be incorporated into the fuselage and wings of an aircraft where the parasitic drag induced suction may be harnessed and redirected to create a low-pressure zone approximate the top surface of a wing, past the leading edge where separation can occur.

Factors such as the Prandtl number may be carefully considered when calculating suction and anti-icing/fowling parameters. The thickness of the boundary layer is normally defined as the distance from the solid body (i.e.: wing) at which the flow velocity is 99% of the free stream velocity. The thermal boundary layer thickness is similarly the distance from the body at which the temperature is 99% of the inviscid solution temperature. The ratio of the two thicknesses is governed by the Prandtl number. If the Prandtl number is 1, the two boundary layers are the same thickness. If the Prandtl number is greater than 1, the thermal boundary layer is thinner than the velocity boundary layer. If the Prandtl number is less than 1, which is the case for air at standard conditions, the thermal boundary layer is thicker than the velocity boundary layer. These factors may be important to a design of a failsafe boundary layer reduction system.

Throughout this document, reference is made to an aircraft. As contemplated herein, an aircraft includes all flying vehicles, manned or unmanned, such as but not limited to airplanes, helicopters, gliders, hang gliders and the like. Wings associated with each of the various aircraft may have different terms when applied to particular aircraft, but they are intended to be encompassed by the term wing. For example, although reference is made throughout this document to a wing, it is contemplated that the wing may comprise a wing of an airplane, a rotor blade of a helicopter, a blade of any other flying aircraft, and the like. Furthermore, principles disclosed in this disclosure are also relevant to energy generators, by wind or other fluid, and other blades and rotors that interact with air or any other fluid and have need to interact efficiently to minimize friction. Reference to a wing, therefore, contemplates any form of a wing, rotor, propeller or blade whether used for air or other fluid.

FIG. 1 depicts airflow in relation to a conventional wing 10, helicopter rotor blade, or wind generator blade of the prior art. More specifically, FIG. 1 depicts the stagnation point 14, laminar flow region 2, instability point 16, transition region 4, turbulent flow region 6, separated flow region 8, and turbulent wake region 12 of airflow in relation to a conventional wing 10 of an aircraft as the aircraft moves. FIG. 1 also illustrates a typical boundary layer 18 and turbulent separation 20 associated with airflow around the external surface of the wing 10. Box 24 diagrams the free velocity of airflow prior to interaction with the wing 10 compared to the drag loss velocity diagrammed in box 22 after the airflow has interacted with the conventional wing 10.

Figure 2:
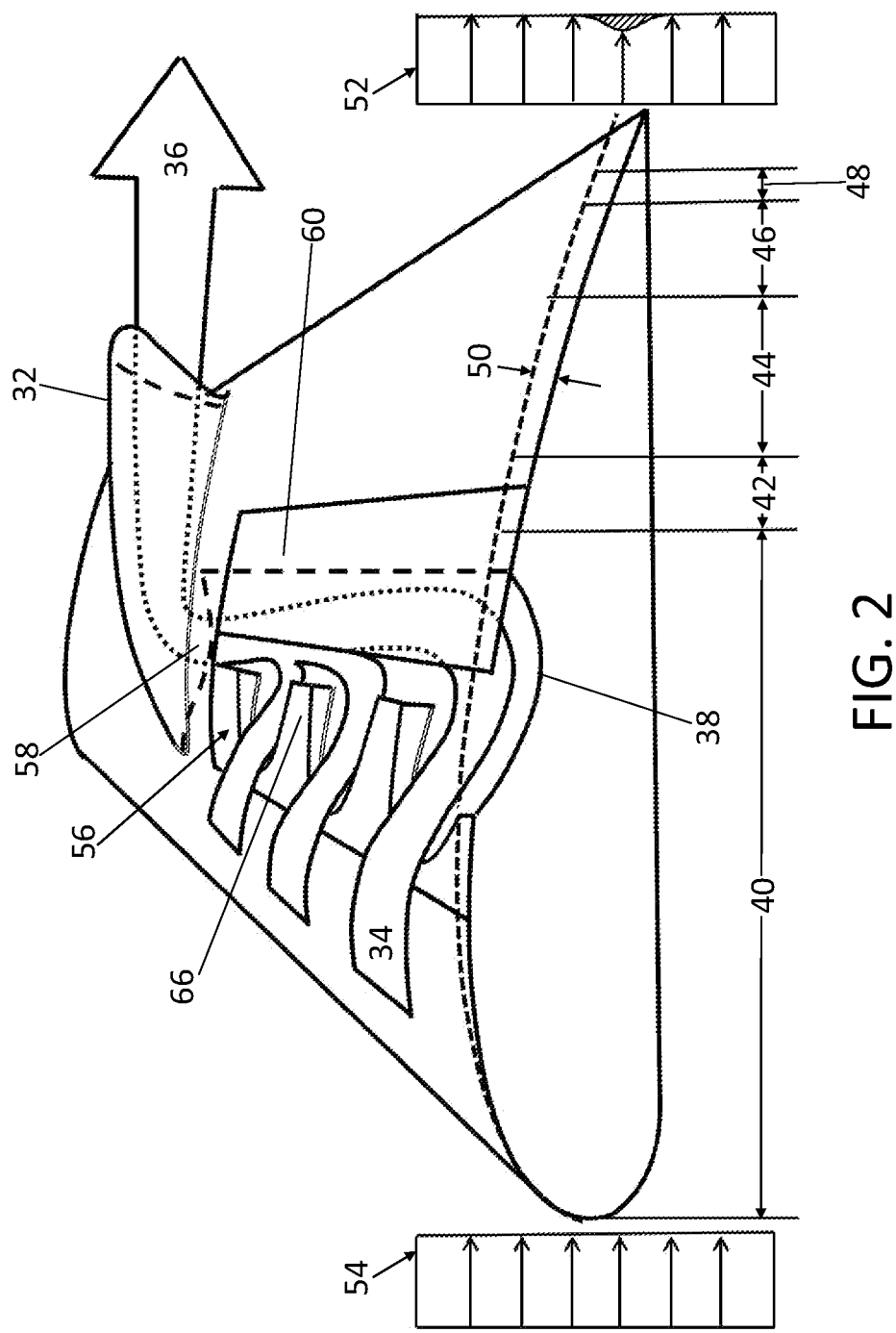
FIG. 2 is a side perspective view of airflow over an aircraft wing in accordance with certain aspects of a boundary layer reducing system.

Generally, various embodiments of this disclosure utilize suction proximate an external surface of an aircraft or vehicle to increase the laminar flow region and reduce the boundary layer (shown in FIG. 2). The suction used in some embodiments may be principally produced passively by parasitic drag rather than by engines or other pump mechanisms. Systems and methods for utilizing parasitic drag as suction will be described in greater detail throughout this document, but may be accomplished, for example and without limitation, by suction generators in areas known or realized to have the greatest relationship and/or inclination to produce parasitic drag during various stages of flight. For example and without limitation, suction generators may be positioned on rearward surfaces of the airframe and its components, including but not limited to wing fairings. Although not required in all embodiments, some systems further comprise an induction apparatus. As shall be described in greater detail with respect to various embodiments presented herein, an induction apparatus is typically configured to introduce airflow to the suction created by the one or more suction generators.

FIG. 2 depicts airflow in relation to a non-limiting embodiment wing 30, a helicopter rotor blade, or a wind generator blade having a laminar flow increasing and boundary layer reducing system. In this non-limiting embodiment, the induction apparatus comprises an induction panel 56 and the suction generator comprises at least a suction vane 32. More particularly, the induction panel comprises a leading edge portion 66, an inlet slot 38, and an inlet plate 60 which may be controlled to adjust airflow. Although not required in all embodiments, the leading edge portion 66 depicted in FIG. 2 comprises a slotted edge proximate the inlet slot 38 to improve airflow into the inlet slot 38. In connection with the suction vane 32, the induction panel sucks or draws down the boundary layer 50.

In the non-limiting embodiment schematically depicted in FIG. 2, the passive suction generator comprises a suction vane 32. The suction vane 32 protrudes from the top surface of the wing 30. The suction vane 32 may comprise any shape and size to increase parasitic drag and create a suction source proximate the wing 30. Although not visible in this view, this embodiment of a suction vane 32 comprises a rearward facing opening similar to the rearward facing opening 68 on the suction vane 32 depicted in FIG. 3. The rearward facing opening 68 is typically in fluid communication with the inlet slot of the induction panel 38. According to some aspects, a suction channel 58 allows fluid communication between the inlet slot 38 and the rearward facing opening 68 of the suction vane. In this and other embodiments contemplated as part of this disclosure, cross ducting to suction channel 58 or other suction duct may be utilized to allow fluid communication between any number or combination of the suction generators and any number or combination of the induction apparatuses.

As the aircraft moves, airflow is created relative to the wing 30. The induction panel 56 is positioned and configured to induce airflow, schematically represented by arrow 34, into the system. In this non-limiting embodiment, the induced airflow 34 passes through the slotted end of the leading edge portion 66 and into inlet slot 38 creating suction which functions to draw down the boundary layer. From the inlet slot 38, the induced airflow 34 passes into the suction channel 58 before being extracted as parasitic drag induced outflow 36 from the rearward facing opening 68 of the suction vane 32.

FIG. 2 also allows for comparisons of regions of the airflow of a conventional wing 10 with a wing 30 comprising a laminar flow increasing and boundary layer decreasing system as contemplated as part of this disclosure. Specifically, the improved wing 30 comprises an increased laminar flow region 40 relative to the laminar flow region 2 of the conventional wing 10, a decreased turbulent flow region 50 relative to the turbulent flow region 6 of the conventional wing 10, a decreased separated flow region 46 relative to the separated flow region 8 of the conventional wing 10, and a decreased turbulent wake region 48 relative to the turbulent wake region 12 of the conventional 10. Also shown schematically in FIG. 2 is that the boundary layer 50 of the improved wing 30 is significantly less than the boundary layer 18 of the convention wing 10. As a result, assuming substantially the same free velocity 54, the drag loss 52 is significantly less in the improved wing 30 than the drag loss 22 of the conventional wing 10.

FIGS. 3A and 3B depict rear and perspective front views, respectively, of another non-limiting embodiment of a wing 30 having a laminar flow increasing and boundary layer reducing system. The suction apparatus of the system comprising not only a suction vane 32, but also a suction port 62 and a wingtip vane 64. In this particular non-limiting embodiment, the suction port 62 is positioned proximate fuselage 76 of an aircraft 100. This suction port 62, or any suction ports described herein, may comprise a rearward facing opening 70 that is typically positioned proximate an area of parasitic drag on a rearward facing surface of an aircraft or vehicle such that the suction port 62 induces suction. Effectiveness of the suction ports 62 may be enhanced by fairings or other aerodynamic considerations. According to some aspects, the rearward facing opening 70 may be either uncontrolled (static) or controlled by devices (dynamic). Dynamic control devices, for example and without limitation, may include covers such as flap-like structures, gate-like slides, or other suitable mechanisms allowing open, closed, and proportioned or controlled settings (in any singular form or any combination). Those dynamic controls may be operated manually or automatically by any suitable mechanism including cable or mechanical linkage, computer and electronics, fluid pressure means, and so forth. Static rearward facing openings 70 may be formed as, for example and without limitation, louvers, slots, ports, and the like or any combination thereof. In one or more embodiments, the rearward facing openings 70 are in fluid communication with the inlet slot 38 of the induction panel 56 through a suction channel 58.

In one or more embodiments, the wingtip vane 64 is positioned on a tip of the wing 30 opposite the fuselage 76. According to some aspects, the wingtip vane 64 comprises a "shark-scale" or triangular shape configured to balances drag on the wing 30. The wingtip vane 64 is further configured to help isolate the tip flow differential. In one or more embodiments, the outer surfaces of the wingtip vane 64 are spread open to a certain or controllable degree so as to produce an effective and efficient suction source for powering the laminar flow increasing and boundary layer reducing system as subject of this discloser. Specifically, some embodiments of a wingtip vane 64 comprise a rearward facing opening 72. Like other rearward facing openings discussed herein, the rearward facing opening 72 may be in fluid communication with an inlet slot 38 through a suction channel 58.

In the particular non-limiting embodiment depicted in FIG. 3, the suction vane 32 comprises a shark-scale shaped suction vane 32. According to some aspects, the suction vane 32 comprises a lower portion 74 positioned and configured to provide drainage for fluid which may enter the system in the form of rain, melted ice and snow, and the like. It is noted that any of the embodiments presented herein may include suitable mechanisms for melting ice and snow, including but not limited to electrical heating of the leading edge portion 66 and/or the aft inlet plate 60 of the induction panel 56. It is further contemplated that in aircraft having wing-mounted engines, the suction vane 32 in an upright or inverted position may be incorporated into the engine mounting pylon.

In flight or other movement, the suction port 62, the suction vane 32, and the wingtip vane 64 may together amplify the parasitic suction effect and may potentially increase the overall effectiveness of the system. Together, these suction apparatuses may also improve the suctioning effect due to various operational modes of the aircraft such as but not limited to low speed landing configurations wherein the parasitic suction ports 62 may have their relative greatest effectiveness and cruise trim configurations wherein the suction vanes 32 may their relative greatest effectiveness. Each particular embodiment may take into consideration the specific aerodynamic features of the aircraft, vehicle, vessel or structure so that the system components may be optimally arranged. Openings in the wing approximate the trailing edge and forward of the flap(s) 78 and aileron(s) 79 may also be utilized to generate additional parasitically induced suction to enhance the performance of the laminar flow increasing and boundary layer reducing system subject of this discloser.

According to some aspects, each wing 30 may comprise a laminar flow increase and boundary layer reducing system having a plurality of induction apparatuses. In the non-limiting embodiment depicted in FIG. 3A, the wing 30 comprises a system having two induction panels 56. In such an embodiment, a first induction panel 56 may be positioned between the suction port 62 and the suction vane 32, and a second induction panel 56 may be positioned between the suction vane 32 and the wingtip vane 64. Similar to the embodiment shown in FIG. 2, the induction panels 56 may comprise a leading edge portion 66, an inlet slot 38, and an inlet plate 60. More particularly, the inlet slot 38 of the first induction panel 56 is typically in fluid communication with the rearward facing opening 70 of the suction port 62 and the rearward facing opening 68 of the suction vane 32 such that airflow induced into the inlet slot 38 is extracted through the rearward facing openings 68 and 70 of the suction vane 32 and suction port 62, respectively. Similarly, the inlet slot 38 of the second induction panel 56 is typically in fluid communication with the rearward facing opening 72 of the wingtip vane 64 and the rearward facing opening 68 of the suction vane 32 such that airflow induced into the inlet slot 38 is extracted through the rearward facing openings 68 and 72 of the suction vane 32 and wingtip vane 64, respectively.

Figure 6:
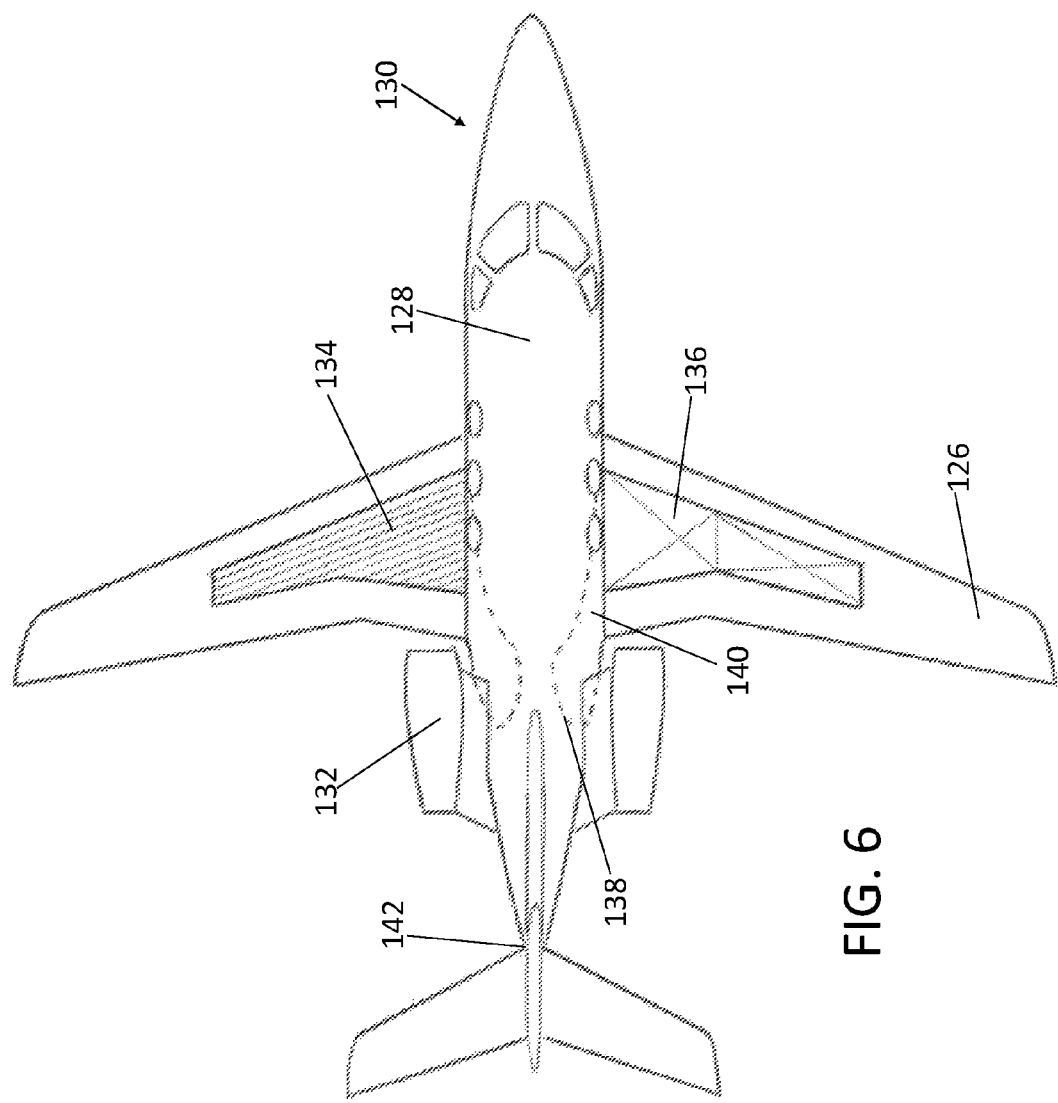
FIG. 6 is a top view of a third embodiment of an aircraft with certain aspects of this disclosure.

According to some aspects, the leading edge portion 66 comprises an arrangement of NACA duct-like, low-drag induction fluting, which enhances airflow such as into the underlying suction segregation pans 136 (shown in FIG. 6). Various embodiments of a wing 30 may further comprise cross-venting adapted so that drag created by flaps 78 and ailerons 79 or other fight controls assist in generating additional low-pressure within the underlying suction segregation pans 136 (shown in FIG. 6).

In one or more embodiments, the aft inlet plate 60 comprises a controllable inlet plate 60 that is movable to at least partially cover or uncover the inlet slot 38 of the induction panel 56. Moving of the inlet plate 60 may include but is not limited to widening of the inlet slot 38, full closure of the inlet slot 38, or partial closure of the inlet slot 38.

Figure 4:
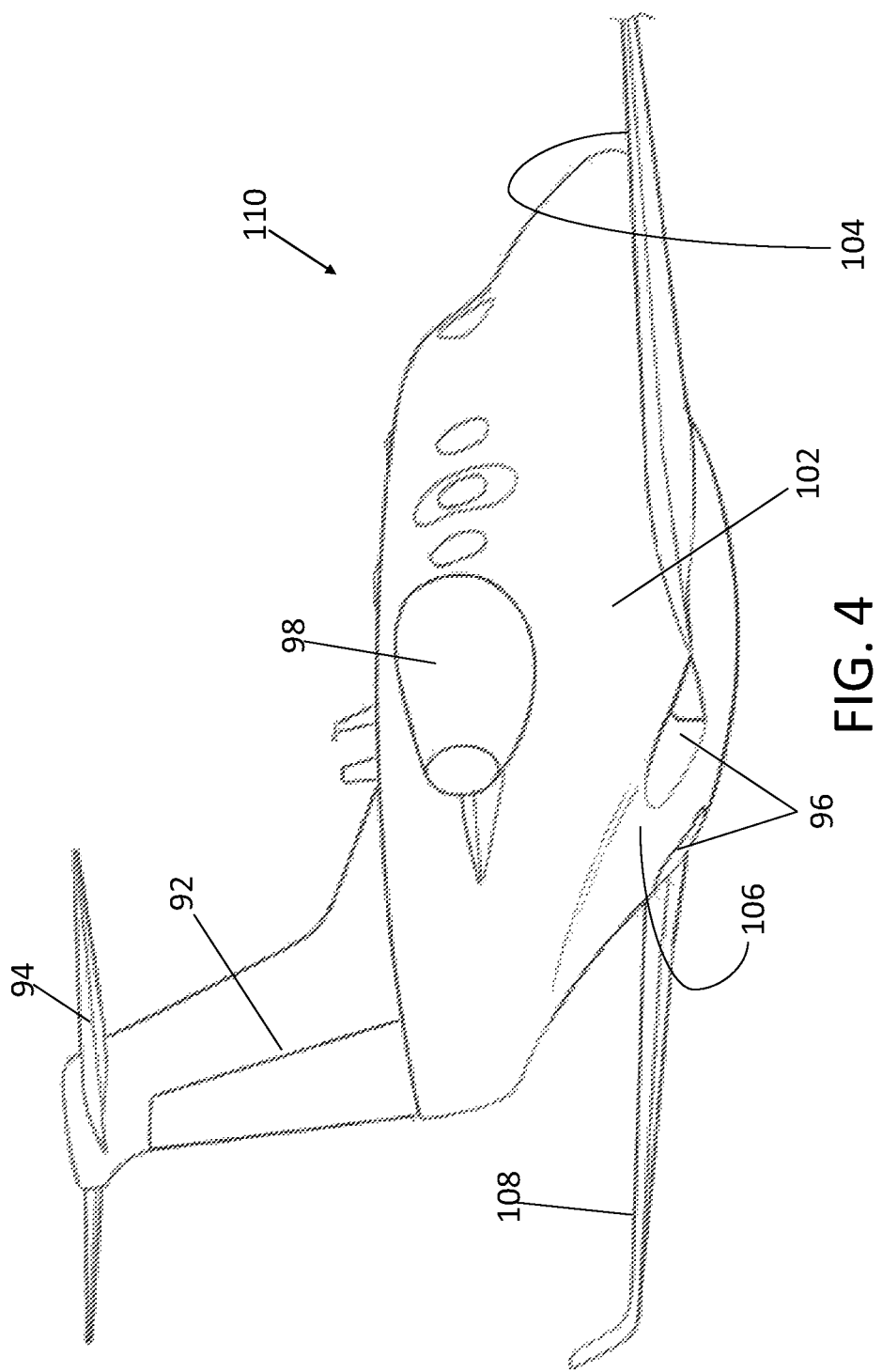
FIG. 4 is a rear perspective view of a first embodiment of an aircraft with a boundary layer reducing system.

FIG. 4 depicts another embodiment of an aircraft 110 comprising a parasitic drag induced boundary layer reduction system of this disclosure. Various embodiments of a parasitic drag induced boundary layer reduction system of this disclosure may be applied to all aircraft reasonable in the art. For example, according to one aspect, the aircraft 110 comprises a fuselage 102, two wings 108 having a top surface 104, an aircraft engine 98, a tail plane 94, and a vertical stabilizer 92. To energize the parasitic drag induced boundary layer reduction system of this disclosure, aircraft 110 may comprise a tail cone that is movable by inward and outward mechanical cone positioning or clam-like hinged portions. Various implementations may include any feature or combination of features of the disclosed device, which may be applied to any vehicle that travels through fluid, including without limitation water or air. Although the parasitic drag induced boundary layer reduction system of this disclosure is applied to an aircraft 110, it is contemplated that implementations may be applied to the other vehicles including but not limiting cars, trains, helicopters (and their rotors), spacecraft, submarines, boats, and the like, as well as structures such as high rise buildings which can be subjected to extreme aerodynamic or fluid dynamic forces.

In one or more embodiments, the parasitic drag induced boundary layer reduction system comprises one or more suction generators such as but not limited to suction ports 96 on a rearward facing surface 106 of the aircraft 110. The suction ports 96 are configured to induce suction by their placement proximate areas of parasitic drag. Effectiveness of the suction ports 96 may be enhanced by fairings or other aerodynamic considerations.

Figure 5:
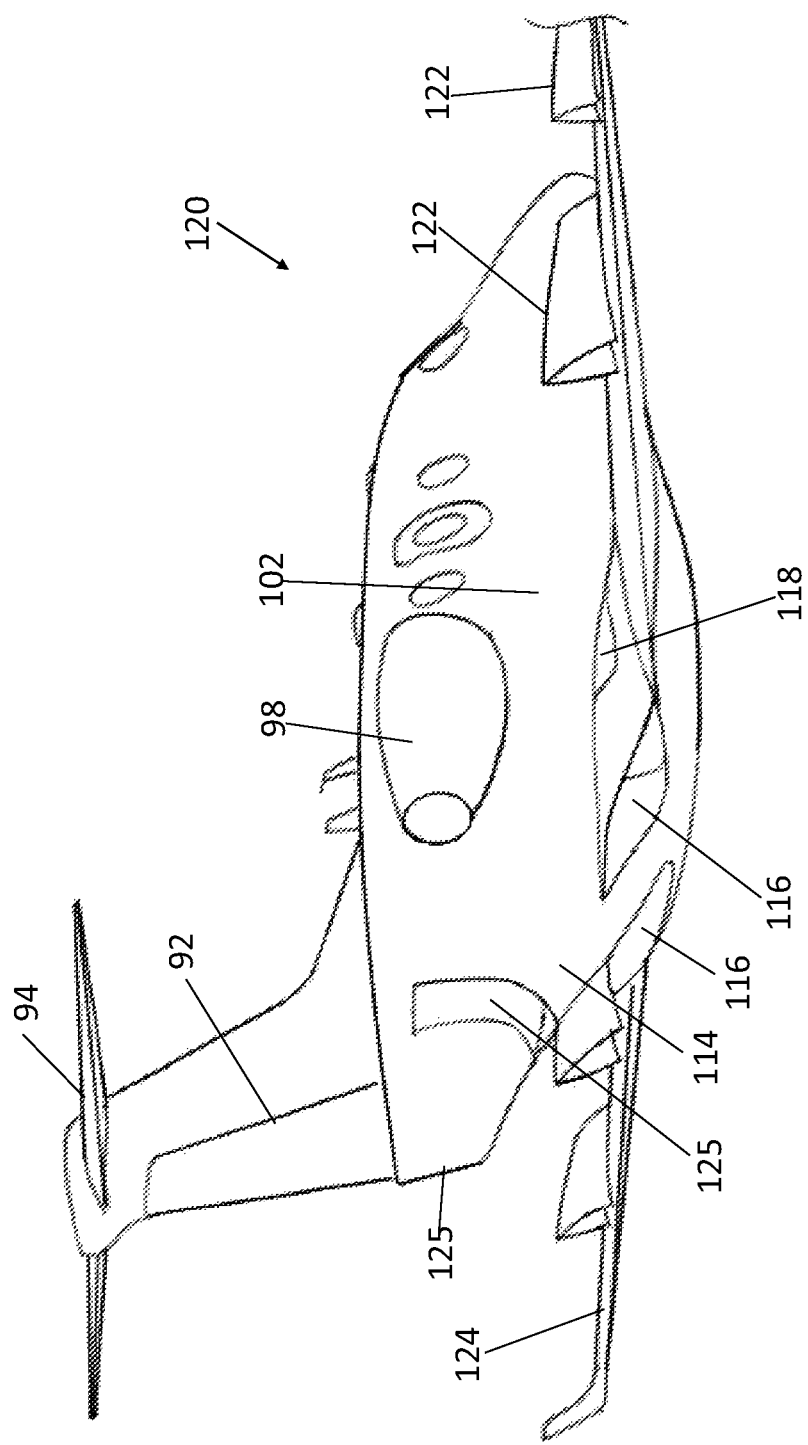
FIG. 5 is a rear perspective view of a second embodiment of an aircraft with a boundary layer reducing system.

FIG. 5 depicts another embodiment of an aircraft 120 having a parasitic drag induced boundary layer reduction system. Similar to other embodiments, the aircraft 120 comprises a fuselage 102, two wings 124 having a top surface 104, an aircraft engine 98, a tail plane 94, tail end 112 and a vertical stabilizer 92. In one or more embodiments, a parasitic drag induced boundary layer reduction system of this disclosure on an aircraft 120 comprises two suction ports 116 on a rearward facing surface 114 of the aircraft 120, two suction vanes 122 on each wing 124, and a slotted tail section 125 proximate the tail 112 of the aircraft 120. The suction ports 116 and suction vanes 122 may comprise any of the various shapes and configurations including those specifically described elsewhere in this disclosure. Similar to the suction port, the slotted tail section 125 is positioned on a rearward facing surface of the tail 112 of the aircraft 120 and configured to amplify the parasitic suction effect.

One or more embodiments of a suction port 116 further comprise a blow-through feature whereby parasitic drag may be reduced when the boundary layer reduction function is less desirable, or to purge the system from contamination. The blow-through feature in such cases may be designed to reduce both induced and parasitic drag by opening or venting the suction port 116 to the oncoming airstream so as to blow-through the suction port 116. The blow-through feature may also be added to the suction vanes 122, wingtip vanes 64 and other adaptive structures of this disclosure such as pylons and fairings. This may result in reduced overall drag, when desirable while lessening the aerodynamic efficiency added by the boundary layer reduction afforded by the function of the disclosed devices in their various adaptable iterations. According to some aspects, a vent or cover 118 is positioned proximate the suction port 116. The cover 118 is configured to cover, either partially or wholly, a forward facing opening that is in fluid communication with the suction port 116. When uncovered, the forward facing opening allows the oncoming airstream to blow through the suction port 116. When at least partially covered by the cover 118, the forward facing opening at least partially prevents oncoming airstream from blowing through the suction port 116.

FIG. 6 depicts a top view of an aircraft 130 comprising a fuselage 128, two wings 126, two engines 132, and a tail 142. For purposes of clarity, FIG. 6 has depicted one wing with an induction panel 134 and one wing with an induction panel 134 removed to show suction segregation pans 136 that are positioned below the induction panel 134 of one or more embodiments. According to some aspects, the suction segregation pans 136 direct suction zones span-wise or chord-wise, or any combination thereof. In embodiments comprising suction vanes 32, the suction segregation pans 136 may be configured to allow fluid communication between the induction panel 134 and the rearward facing opening 68 of the suction vane 32. More particularly, the suction segregation pans 136 may be in fluid communication with the suction channel 58 or a plurality thereof.

The parasitic drag induced boundary layer reduction system of some embodiments, such as the non-limiting embodiment depicted in FIG. 6, comprises a wide chord-span induction panel 134 on each wing 126 and two suction ports 138. The suction ports 138 may comprise any configuration of suction ports described elsewhere in this document. According to some aspects, the each suction port 138 is in fluid communication with a suction segregation pan 136 on a wing 126 through a suction channel 140.

Each induction panel 134 may be disposed in the area of a wing 126 of greatest known potential for boundary layer separation. Effectiveness of the induction panel 134 in distributing suction upon the airflow over the wing may be predetermined by the design of the suction segregation pans 136. Each induction panel 134 is configured to produce a vacuum effective by utilizing the suction channel 140 of the suction ports 16, which may open to areas of induced or parasitic drag.

Figure 7:
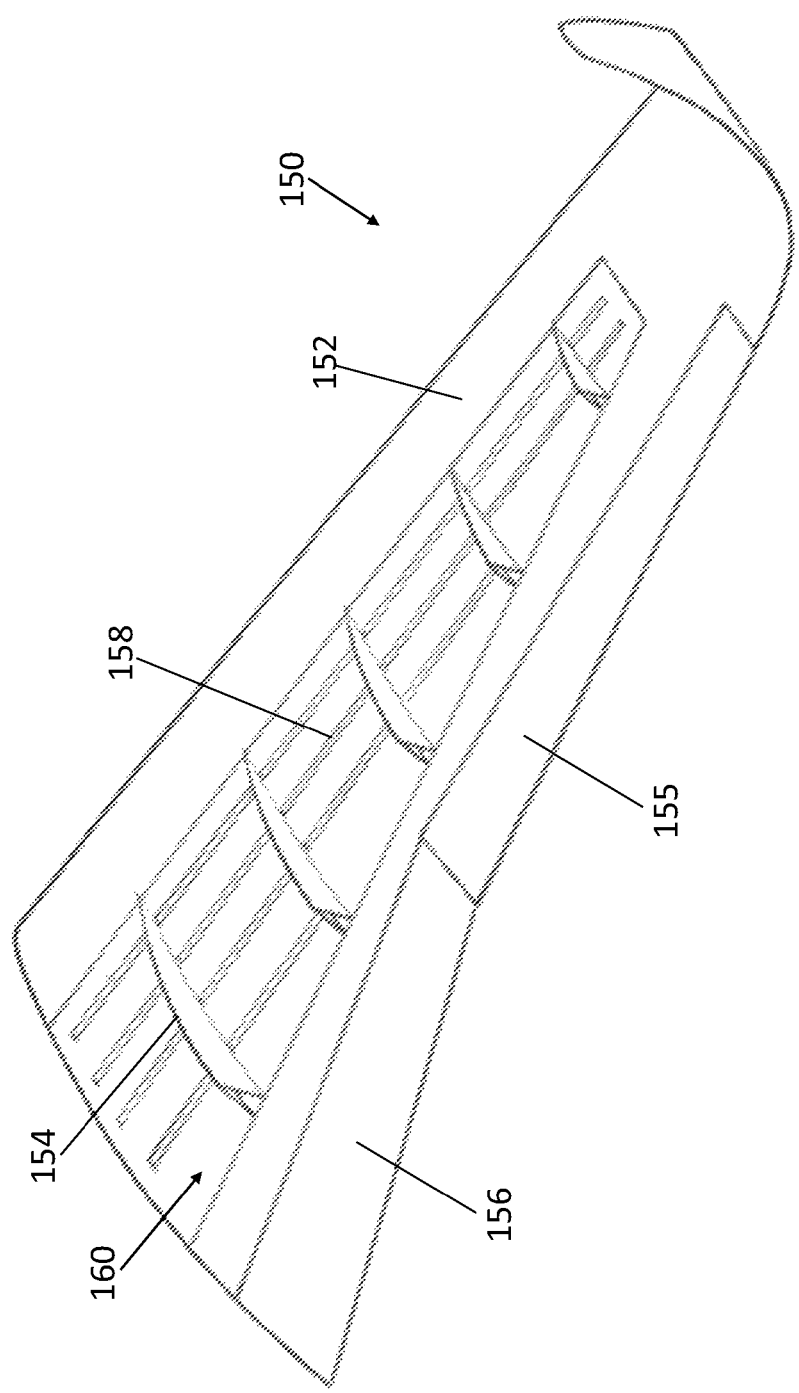
FIG. 7 is a top perspective view of a wing according to one aspect of this disclosure.

One or more embodiments of an induction panel 134 comprise transverse or spanning induction slots, such as those shown in greater detail in FIG. 7. The induction slots are typically arrayed respective to a top surface of the wing 126 and are configured with an efficient geometry for inlets to the induction panel 134. The induction slots are positioned on the induction panel to induce a more laminar flow by reducing the boundary layer separation effect. As described elsewhere in this document, other embodiments of an induction panel 134 may comprise holes, NACA inlets, or any combination thereof.

FIG. 7 depicts a top rear quarter view of a wing 150 that may be applied to a typical light jet or other aircraft. The wing 150 of this non-limiting embodiment is depicted fitted with an induction panel 160 on a top surface 152 of the wing 150. The induction panel 160 is typically positioned on a top surface 152 of the wing 150 where boundary layer separation typically occurs. One or more embodiments of an induction panel 160 comprise a plurality of induction slots 158. In this embodiment, the induction slots 158 are substantially transverse in position across the wing 150 between the fuselage and near the wingtip. Although not visible in FIG. 7, the induction panel 160 may be placed over a suction segregation pan(s) 136.

According to some aspects, a parasitic drag induced boundary layer reduction system comprises suction vanes 154 as depicted in the non-limiting embodiment of FIG. 7. Like other suction vane embodiments, the suction vanes 154 are typically suction generators that increase parasitic suction proximate the induction panel 160. In some embodiments, the suction vanes 154 are substantially triangular in shape, having a point disposed opposite the induction panel 160. When the wing is moving through the air, in one or more embodiments, airflow may enter the induction slots 158, pass through the suction segregation pans 136, and be extracted from the suction vanes 154 by parasitic drag forces. The suction vane 154 may further reduce transverse flow across the top surface 152 of the wing 150. In wing mounted engine application, the suction vanes 154 may be incorporated into the engine nacelle and/or coupled pylon fairing to include generally rear facing openings approximate areas of greatest occurring or enhanced parasitic drag. Alternately, ducting or channeling to areas of greatest known or induced parasitic drag may include slots or other openings proximate the flight control portions, such as but not limited to flaps 156 and ailerons 155.

FIG. 8 depicts another non-limiting embodiment of a wing 151 that may be adapted to aircraft otherwise known in the art. In this particular embodiment, a boundary layer skirt 170 is coupled to the wing 151 as an add-on assembly, the boundary layer skirt 170 comprising induction apparatuses and suction generators. Although shown applied to a wing 151 in FIG. 8, it is contemplated that the add-on assembly of the boundary layer skirt 170 may be applied to other vehicles, such as but not limited to automobiles, boats, trains, ships, and the like, as well as certain structures imposed upon by aerodynamic forces.

According to some aspects, the boundary layer skirt 170 comprises an induction panel 164 that, when coupled to the wing 151 with suitable structure and support, may be positioned within the space immediately adjacent the top surface 152 of the wing 151 coinciding with the boundary layer occurrence. The induction panel 164 may comprise a plurality of induction slots 168 similar to any of those described elsewhere in this document.

This and other configurations of a boundary layer skirt may further comprise a spanning diffuser portion 162. The spanning diffuser portion 162 may act alone or in combination with suction vanes 166 to induce an area of parasitic drag in order to produce a suction source. The suction vanes 166 may comprise any suction vanes 166 described herein. By proximity or further ducting to the induction slots 168, the airflow may be drawn about the wing near the top surface of the boundary layer skirt 170, which may be contoured as to approximate the profile of the wing 151. According to some aspects, the boundary layer skirt is configured to reduce the boundary layer and increase laminar flow.

In one or more embodiments, a forward edge 169 of the boundary layer skirt 170 may be integral or in contact with the top surface 152 of the wing 151. In other embodiments, the forward edge 169 of the boundary layer skirt 170 is fixedly or adjustably open to a certain degree. In comparison, a trailing edge 167 of the boundary layer skirt 170, including the spanning diffuser portion, may be open or adjustably opened, slotted, or spaced from the top surface 152 of the wing 151 to such an extend to produce the desired parasitic suction phenomenon. The general structure and function of the boundary layer skirt 170 may also be incorporated more fully into the wing design. For example, slots or other openings in the top surface 152 of the wing 151 may be exposed to an underlying pan with its vacuum source being any of the other apparatuses described herein.

Figure 9A:
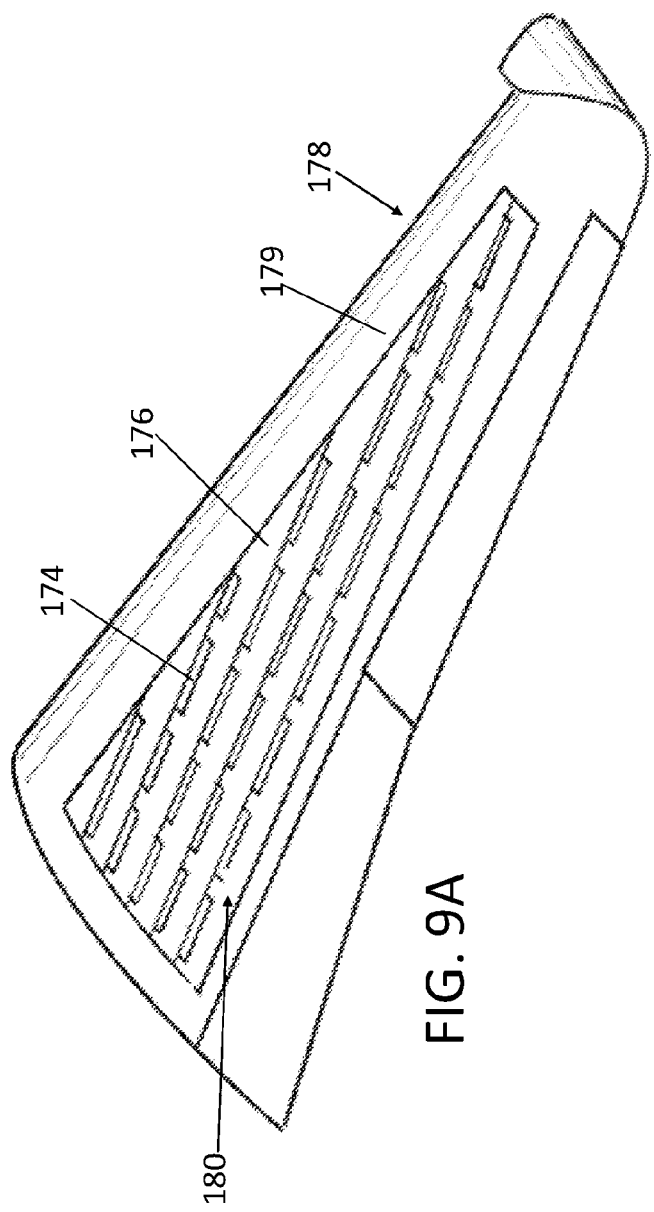
FIG. 9A is a top perspective view of a wing according to another aspect of this disclosure.
Figure 9B:
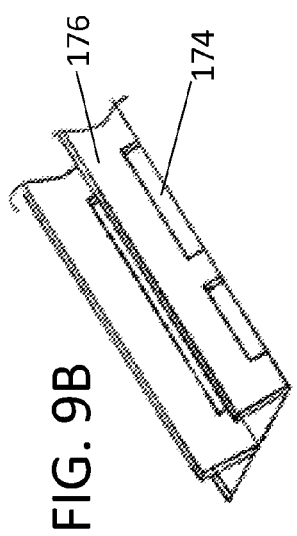
FIG. 9B is a perspective view of blades of an induction panel.

FIG. 9 depicts a non-limiting embodiment of a wing 178 comprising a parasitic drag induced boundary layer reduction system. In one or more embodiments, a parasitic drag induced boundary layer reduction system comprises an induction panel 180 on a top surface 179 of a wing 178, the induction panel comprising a series of transversely positioned blades 176. The blades 176 may be hingedly or otherwise moveably coupled to the induction panel 180 or stationary relative to the induction panel 180. In some, non-limiting embodiments, the blades' movement may act as spoilerons, speed brakes, or similar flight controls when actuated individually, in pairs, or in other specific groupings as aerodynamic specifications may dictate; insomuch, the position (including under-wing), width, span, paring and movement of the blades may vary wildly according to the desired functionally which in one or more embodiments (dismissing even the laminar flow function as primary) may amount to an active wing surface that in some cases may be highly computer controlled. The blades 176 may also be opened to clear and/or inspect and service the system. The blades of some embodiments comprise stepped blades 176. According to some aspects, the blades 176 comprise one or more induction slots 174. The induction slots 174 may, alternatively, be replaced with holes or other port-like shapes including those of NACA duct and/or shark scale geometry.

As referenced elsewhere in this document, it is contemplated that all of the disclosed elements of the systems and methods may be applied to any vehicle moving through any fluid and/or any stationary structure exposed to aerodynamic concern. Embodiments of the passive parasitic drag induced boundary layer reduction system may have one or more of the following advantages over the conventional systems: the system may improve laminar flow around a body by utilizing the pressure gradient derived from parasitic drag to reduce boundary layer separation through various ports, slots, ducts, and other features disclosed herein; the system may reduce overall drag on the moving object which may reduce fuel consumption; the system may negate the need for an active laminar flow system, such as those which utilize a pump of any kind, and may thus save weight; the system may enable other surface controls such as but not limited to air brakes; and, implementations that utilize an adjustable blow through feature may reduce the parasitic drag when the system is not modifying the boundary layer. The system may be used to reduce aerodynamic pressure upon vulnerable structures, without limitation such as high-rise buildings, bridge roadbeds, and towers.

As previously referenced, aspects of this disclosure may be applied to helicopters. Unless otherwise specified, the helicopter may comprise any helicopter previously known in the art. According to one aspect, a parasitic drag induced boundary layer reduction system is applied to helicopter rotor blades. The system may comprise a suction generator configured to induce parasitic drag so as to produce suction used to lessen boundary layer effect and improve laminar air flow about the rotor, the suction generator comprising at least one rotor tip suction port or vane. The system may further comprise an induction apparatus and/or slot configured to introduce airflow about the rotor to suction created by the suction generator during flight.

Various implementations and embodiments of a parasitic drag induced boundary layer reduction system may include one or more of the following. A suction generator configured to induce parasitic drag so as to produce suction used to lessen boundary layer effect and improve laminar air flow about the rotor, the suction generator comprising at least one rotor tip suction port or vane. An induction apparatus or slot approximate the leading edge of the rotor configured to introduce oncoming airflow to suction created by the suction generator during flight to reduce induced drag.

FIG. 10 depicts a non-limiting embodiment of helicopter rotor blades 190 comprising an induction apparatus 198 or induction panel and a rotor tip suction vane 193. Directional rotation of the rotor blades 190 is shown as arrow 197. In this non-limiting embodiment, the induction apparatus 198 comprises a first air inlet slot 195 and a second air inlet slot 199. Other embodiments may comprise only one of either the first air inlet slot 195 or the second air inlet slot 199.

According to some aspects, a rotor tip suction vane 193 is positioned on or proximate a terminating end of each rotor blade 190. In other embodiments, the rotor tip suction vane 193 may be positioned anywhere on the rotor blade 190. The rotor type suction vane 193 typically comprises a suction channel in fluid communication with the first air inlet slot 195, the second air inlet slot 199, or both. In operation, oncoming airflow 191 may enter the first air inlet slot 195 at a leading edge of the rotor blade 190. Airflow 192 may also enter the second air inlet 199. After entering the induction panel 198, airflows 191, 192 may exit or exhaust the system as parasitic drag induced outflow 194.

Also contemplated as part of this disclosure is application of a parasitic drag induced boundary layer reduction system to a wind generator, specifically the blades of a wind generator. According to on aspect, the system comprises a suction generator configured to induce parasitic drag so as to produce suction used to lessen boundary layer effect and improve laminar air flow about the blades of the wind generator, the suction generator comprising at least one blade tip suction port or vane. The system may further comprise an induction apparatus and/or slot configured to introduce airflow about the blade to suction created by the suction generator during its rotation.

Various implementations and embodiments of such a wind generator may include one or more of the following. A suction generator configured to induce parasitic drag so as to produce suction used to lessen boundary layer effect and improve laminar air flow about the blade, the suction generator comprising at least one blade tip suction port or vane. An induction apparatus or slot approximate the leading edge of the blade configured to introduce oncoming airflow to suction created by the suction generator during rotation of the blade to reduce induced drag.

The components used for a parasitic drag induced boundary layer reduction system of this disclosure, such as those shown herein, may be made of conventional materials used to make goods similar to these in the art, such as, by non-limiting example, aluminum, steel, other metals, ceramics, Kevlar, carbon fiber, other composite materials, polycarbonate, polyvinylchloride (PVC) or other rigid or flexible rubbers, plastics, or resins. Those of ordinary skill in the art will readily be able to select appropriate materials It will be understood that implementations are not limited to the specific components disclosed herein, as virtually any components consistent with the intended operation of a method and/or system implementation for a parasitic drag induced boundary layer reduction system may be utilized. Accordingly, for example, although particular parasitic drag induced boundary layer reduction systems may be disclosed, such components may comprise any shape, size, style, type, model, version, class, grade, measurement, concentration, material, weight, quantity, and/or the like consistent with the intended operation of a method and/or system implementation for a parasitic drag induced boundary layer reduction system.

In places where the description above refers to particular implementations of parasitic drag induced boundary layer reduction systems and methods, it should be readily apparent that a number of modifications may be made without departing from the spirit thereof and that these implementations may be applied to other parasitic drag induced boundary layer reduction system. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A parasitic drag induced boundary layer reduction system for an aircraft comprising at least two wings, comprising:

a suction generator configured to induce parasitic drag so as to produce suction used to lessen boundary layer effect and improve laminar airflow about the aircraft, the suction generator comprising at least one suction port on a rearward facing surface of a fuselage of the aircraft behind the at least two wings on a surface of the fuselage that also delimits a bottom surface of the aircraft, or on a tail section of the aircraft behind the at least two wings on a surface of the tail section that also delimits a bottom surface of the aircraft; and an induction panel positioned on a surface of each of the at least two wings, wherein each induction panel is in fluid communication with the at least one suction port on the fuselage or on the tail section through a communication channel between the induction panel and the at least one suction port, each induction panel comprising at least one elongated inlet slot opening into the communication channel and configured to introduce airflow into the suction generator as the aircraft is in flight.

2. The parasitic drag induced boundary layer reduction system of claim 1, wherein the suction generator further comprises at least a suction vane on each of the at least two wings of the aircraft and the induction panel comprises a leading edge portion and the elongated inlet slot is positioned with its elongated length extending lengthwise on each wing between the fuselage of the aircraft and a tip of each respective wing proximate an area of flow separation aft of the leading edge portion, the inlet slot being in fluid communication at least partially through the wing with a rearward opening on the suction vane such that airflow enters the inlet slot responsive to the suction generator as the aircraft is in flight and exits through the rearward opening of the suction vane.

3. The parasitic drag induced boundary layer reduction system of claim 2, wherein:
the suction generator further comprises a wingtip vane, the wingtip vane comprising a rearward opening; and
the system further comprises a second induction panel on each of the at least two wings positioned between the suction vane and the wingtip vane, the second induction panel comprising a leading edge portion and an inlet slot proximate the leading edge portion in fluid communication with the rearward openings of the suction vane and the wingtip vane such that airflow enters the inlet slot responsive to the suction generator as the aircraft moves and exits through the rearward openings of the wingtip vane and suction vane.

4. The parasitic drag induced boundary layer reduction system of claim 3, wherein a lower section of the suction vane is configured to provide drainage for fluid entering the inlet slot of either the first or second induction panel.

5. The parasitic drag induced boundary layer reduction system of claim 4, wherein each induction panel comprises an inlet plate proximate the inlet slot, the inlet plate being movable during flight to at least partially close the inlet slot.

6. The parasitic drag induced boundary layer reduction system of claim 2, wherein the aircraft comprises an airplane and the suction vane on each wing of the airplane is separated from the induction panel on each wing of the airplane by a portion of the wing, the inlet slot being in fluid communication with the rearward opening of the suction vane through a suction channel.

7. The parasitic drag induced boundary layer reduction system of claim 2, wherein the elongated inlet slot is positioned parallel to the leading edge portion.

8. The parasitic drag induced boundary layer reduction system of claim 1, wherein the at least one suction port comprises a rearward opening in fluid communication with at least one elongated inlet slot on one of the induction panels such that airflow enters the elongated inlet slot responsive to the suction generator as the aircraft is in flight and exits through the rearward opening of the suction port.

9. The parasitic drag induced boundary layer reduction system of claim 1, wherein each of the at least one suction port comprises:
at least one rearward facing cover operably coupled to the at least one suction port and configured to cover and uncover the at least one suction port; and
at least one forward facing cover operably coupled to the at least one suction port and configured to cover and uncover a forward facing opening in fluid communication with the at least one suction port.

10. The parasitic drag induced boundary layer reduction system of claim 1, wherein the induction panel comprises a plurality of transverse blades extending parallel to the elongated inlet slot and further comprising a plurality of induction slots extending through the plurality of transverse blades.

11. The parasitic drag induced boundary layer reduction system of claim 10, wherein the plurality of transverse blades are each movably coupled to the induction panel and configured to assist in flight control of the aircraft through movement of the plurality of transverse blades.

12. The parasitic drag induced boundary layer reduction system of claim 1, further comprising a boundary layer skirt coupled to each wing of the aircraft, wherein the suction generator comprising a plurality of suction vanes coupled to the boundary layer skirt and the induction panel comprises a plurality of induction slots positioned on the induction panel.

13. The parasitic drag induced boundary layer reduction system of claim 1, wherein the suction port is on the rearward facing surface of the fuselage below a center of the aircraft.

14. The parasitic drag induced boundary layer reduction system of claim 1, wherein the suction port is on the tail section of the aircraft below a vertical stabilizer of the aircraft.

15. The parasitic drag induced boundary layer reduction system of claim 1, wherein the at least one suction port extends rearward on the bottom surface of the plane through a concave opening within the bottom surface of the aircraft.

16. The parasitic drag induced boundary layer reduction system of claim 1, wherein the rearward facing surface of the fuselage comprises a majority of a total length of the fuselage immediately forward of the rearward facing surface and does not extend outward of the fuselage through a fairing.

17. A method of controlling aircraft external airflow, comprising:
generating parasitic drag to create suction with a suction generator on one or more rearward facing surfaces of a fuselage or a tail section of the aircraft positioned behind at least two wings of the aircraft as the aircraft moves on a surface of the fuselage or tail section that is also a bottom surface of the aircraft, the suction generator comprising at least one suction port positioned on the one or more rearward facing surfaces of the fuselage or the tail section, and at least one induction panel on each wing in fluid communication with the at least one suction port through a communication channel; and
introducing, through elongated slots on the at least one induction panel, the suction created by the suction generator to airflow as the aircraft is in flight.

18. The method of claim 17, wherein introducing, with the induction panel, the suction created by the passive suction generator to the airflow comprises introducing the airflow to the suction by directing the airflow into at least one of the elongated slots of the induction panel with a leading edge portion of the induction panel and directing the airflow out of a rearward facing opening on a suction vane in fluid communication with the inlet slot.

19. The method of claim 17, further comprising adjusting the parasitic drag of the aircraft while the aircraft is in flight by adjusting an inlet plate proximate at least one of the elongated slots to at least partially cover or uncover the at least one of the elongated slots.

20. The method of claim 19, further comprising adjusting the parasitic drag of the aircraft while the aircraft is in flight by partially or closing a forward facing opening on the suction port, the forward facing opening being in fluid communication with the suction port.

21. The method of claim 20, further comprising coupling a boundary layer skirt to each wing of the aircraft, the boundary layer skirt comprising the passive suction generator and the induction panel.

22. A parasitic drag induced boundary layer reduction system for an aircraft, comprising:

a suction generator configured to induce parasitic drag so as to produce suction used to lessen boundary layer effect and improve laminar airflow about the aircraft, the suction generator comprising at least one of a suction port on a rearward facing surface of the aircraft, a suction vane on each wing of the aircraft, a wingtip vane on each wing of the aircraft, and a slotted tail section on a tail of the aircraft; and an induction panel comprising an elongated inlet slot and configured to introduce airflow to suction created by the suction generator as the aircraft is in flight;

wherein the induction panel comprises a plurality of transverse blades extending parallel to the elongated inlet slot and further comprising a plurality of induction slots extending through the plurality of transverse blades; and wherein the plurality of transverse blades are each movably coupled to the induction panel and configured to assist in flight control of the aircraft through movement of the plurality of transverse blades.

* * * * *